US005927073A

United States Patent [19]
Ishizaki et al.

[11] Patent Number: 5,927,073
[45] Date of Patent: Jul. 27, 1999

[54] ELECTRIC HYDRAULIC HYBRID MOTOR

[75] Inventors: Naoki Ishizaki, Minami Kawachimachi; Kazuo Uehara, Tokyo; Hiromasa Yamaguchi, Oyama, all of Japan

[73] Assignee: Komatsu Ltd., Tokyo, Japan

[21] Appl. No.: 08/913,027

[22] PCT Filed: Mar. 5, 1996

[86] PCT No.: PCT/JP96/00524

§ 371 Date: Sep. 5, 1997

§ 102(e) Date: Sep. 5, 1997

[87] PCT Pub. No.: WO96/27937

PCT Pub. Date: Sep. 12, 1996

[30] Foreign Application Priority Data

Mar. 6, 1995 [JP] Japan .................................. 7-070388

[51] Int. Cl.$^6$ .................................................. F16D 39/00
[52] U.S. Cl. ................................................. 60/487; 60/488
[58] Field of Search ................................ 60/487, 488, 489

[56] References Cited

U.S. PATENT DOCUMENTS 5,228,290 7/1993 Speggiorin ............................ 60/488 X
5,259,194 11/1993 Okada ................................... 60/487 X

FOREIGN PATENT DOCUMENTS 49-39721 4/1974 Japan .
50-59696 5/1975 Japan .
53-37523 10/1978 Japan .

*Primary Examiner*—Hoang Nguyen
*Attorney, Agent, or Firm*—Sidley & Austin

[57] ABSTRACT

The present invention is an electric hydraulic hybrid motor which can be made smaller in size and can provide excellent performance. To this end, a hydraulic pump (20) and a hydraulic motor (60) are respectively placed inwardly of the stator (12) of an electric motor (10) and the rotor (14) of the electric motor (10), and the hydraulic pump (20) includes a cylinder block (21) for the pump and a plunger (23) for the pump which are adapted to rotate together with the rotor (14), and the hydraulic motor (60) includes a cylinder block (61) for the motor and a plunger (23a) for the motor.

23 Claims, 7 Drawing Sheets

ELECTRIC HYDRAULIC HYBRID MOTOR

TECHNICAL FIELD

The present invention relates to an electric hydraulic hybrid motor, and particularly to an electric hydraulic motor which houses a hydraulic pump driven by an electric motor, and a hydraulic motor, which outputs torque by receiving oil pressure from the hydraulic pump, positioned inside the electric motor.

BACKGROUND ART

Conventionally, it is known that a hydraulic pump, driven by an electric motor, and a hydraulic motor, outputting torque by receiving pressurized oil from the hydraulic pump, can be provided integrally with the electric motor (for example, Japanese Patent Application Publication (B1) 53-37523). According to the Japanese Patent Application Publication (B1) 53-37523, the hydraulic variable speed electric motor is provided with a rotor, which is located inwardly of the stator of the electric motor, and a hollow shaft, which is located inwardly of the rotor and which is hollow with both ends being supported by bearings. The hollow shaft is electrically driven integrally with the rotor, and is used as an input shaft for the power of the hydraulic pump. A projecting shaft, which is integral with the outside case for the stator and rotor of the electric motor is fixedly provided at the hollow shaft. The hydraulic pump is provided in the direction of the outer diameter of the projecting shaft and axially adjacent to the stator and the rotor of the electric motor. The hollow shaft and the projecting shaft, provided fixedly and integrally with the hollow shaft, are supported by the bearings at three points. The hydraulic motor is provided inside the hollow shaft so as to oppose the hydraulic pump. The pressurized oil from the hydraulic pump goes to the external case of the electric motor, from the hydraulic pump through the rotating hollow shaft and the integrated projecting shaft and is further sent from the external case to the hydraulic motor.

However, in the above-described conventional hydraulic variable speed electric motor, the hydraulic pump is placed axially adjacent to the stator and the rotor of the electric motor; therefore, the length of the hydraulic variable speed electric motor is great. In addition, the pressurized oil from the hydraulic pump is sent through the rotating hollow shaft and the integrated projecting shaft to the external case, and is sent from the external case to the hydraulic motor; therefore, the hydraulic variable speed electric motor similarly has the great length. Further, the hollow shaft and the integrated projecting shaft are supported by the bearings at three points, making the center shaft core difficult to access, and a large clearance between the external case and the rotating integrated projecting shaft is necessary. For this reason, there is a disadvantage of increased leakage of the pressurized oil from the clearance.

SUMMARY OF THE INVENTION

The present invention is made in order to eliminate the disadvantages of the above-described conventional art, and its object is to provide an electric hydraulic hybrid motor, which is designed to be small in size by housing a hydraulic pump and a hydraulic motor in the electric motor, and which has excellent performance.

The electric hydraulic hybrid motor relating to the present invention is an electric hydraulic hybrid motor which includes an electric motor, a hydraulic pump driven by the electric motor, and a hydraulic motor driven by the hydraulic pump, with the hydraulic pump or the hydraulic motor being placed inwardly of the rotor of the electric motor, and is characterized: by the hydraulic pump being placed inwardly of the stator of the electric motor and the hydraulic motor being placed inwardly of the rotor; by the hydraulic pump including, a cylinder block for the pump and a plunger for the pump which are rotated integrally with the rotor; and by the hydraulic motor including a cylinder block for the hydraulic motor and a plunger for the hydraulic motor.

The electric hydraulic hybrid motor can suitably include a port block, which supplies and discharges oil, between the cylinder block for the pump and the cylinder block for the motor; and a case, which is provided with the electric motor, the hydraulic pump, and the hydraulic motor positioned therein, and which supports the port block.

The electric hydraulic hybrid motor can suitably include a port block, which supplies and discharges oil, between the cylinder block for the pump and the cylinder block for the motor, and which is supported by the rotor Further, it is desirable that the case have a cooling device attached. The port block can be provided with a charging circuit.

According to the structure of the above-described invention, the rotor is rotationally driven by passing electric current through the coil of the stator, and the cylinder block for the pump and the pump plungers are integrally rotated with the rotor. As a result of the rotation, the plungers for the pump stroke the cylinder block for the pump by the variable swash plate control device, and pressurized oil is discharged. The pressurized oil is sent to the plungers of the motor via the port block, which discharges and supplies oil between the cylinder block for the pump and the cylinder block for the motor, and the plungers of the motor stroke the cylinder block for the motor. By the stroke of the plungers of the motor, the swash plate setting device of the hydraulic motor is pressed, and the output shaft, which is integral with the cylinder block for the motor, is rotated, with torque being outputted. Heat generated by the electric motor, the hydraulic pump, and the hydraulic pump is absorbed by the lubricating oil inside the case, and the lubricating oil is then sent to the cooling device to be cooled. The cooled lubricating oil is returned to the inside of the case to cool and lubricate the coil of the stator, the bearings of the hydraulic pump, and so on. At this time, it is preferable to detect and control the temperature of the lubricating oil so that the temperature becomes a specified temperature. The pressurized oil leaking from the hydraulic pump, the hydraulic motor, and so on, is supplied and replenished by the charging circuit (for example, check-valves) being actuated.

BEST MODE FOR CARRYING OUT THE INVENTION

A preferred embodiment of an electric hydraulic hybrid motor relating to the present invention will be particularly described below with reference to the attached drawings.

Figure 1:
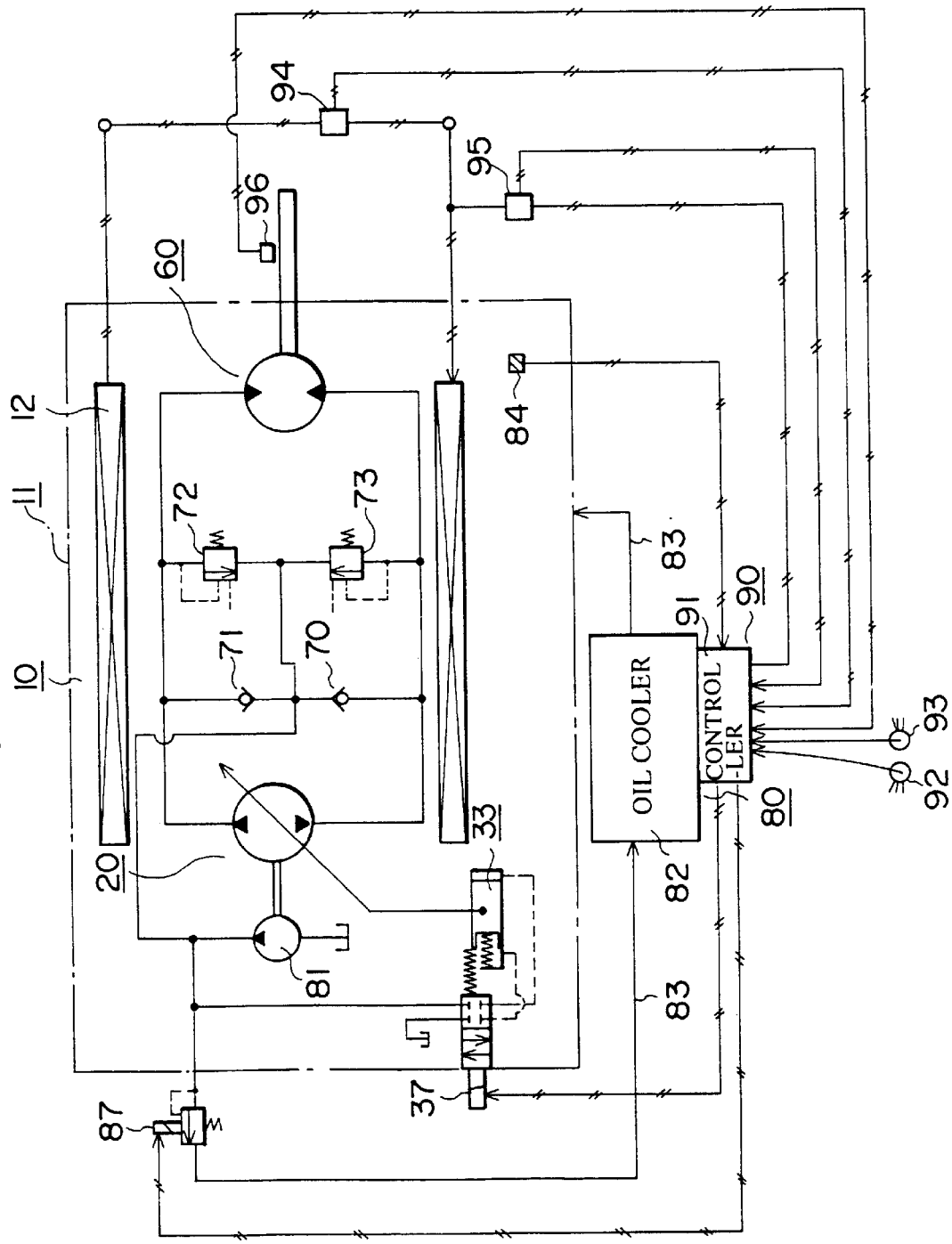
FIG. 1 is a general block diagram of an electric hydraulic hybrid motor relating to a first embodiment of the present invention.
Figure 2:
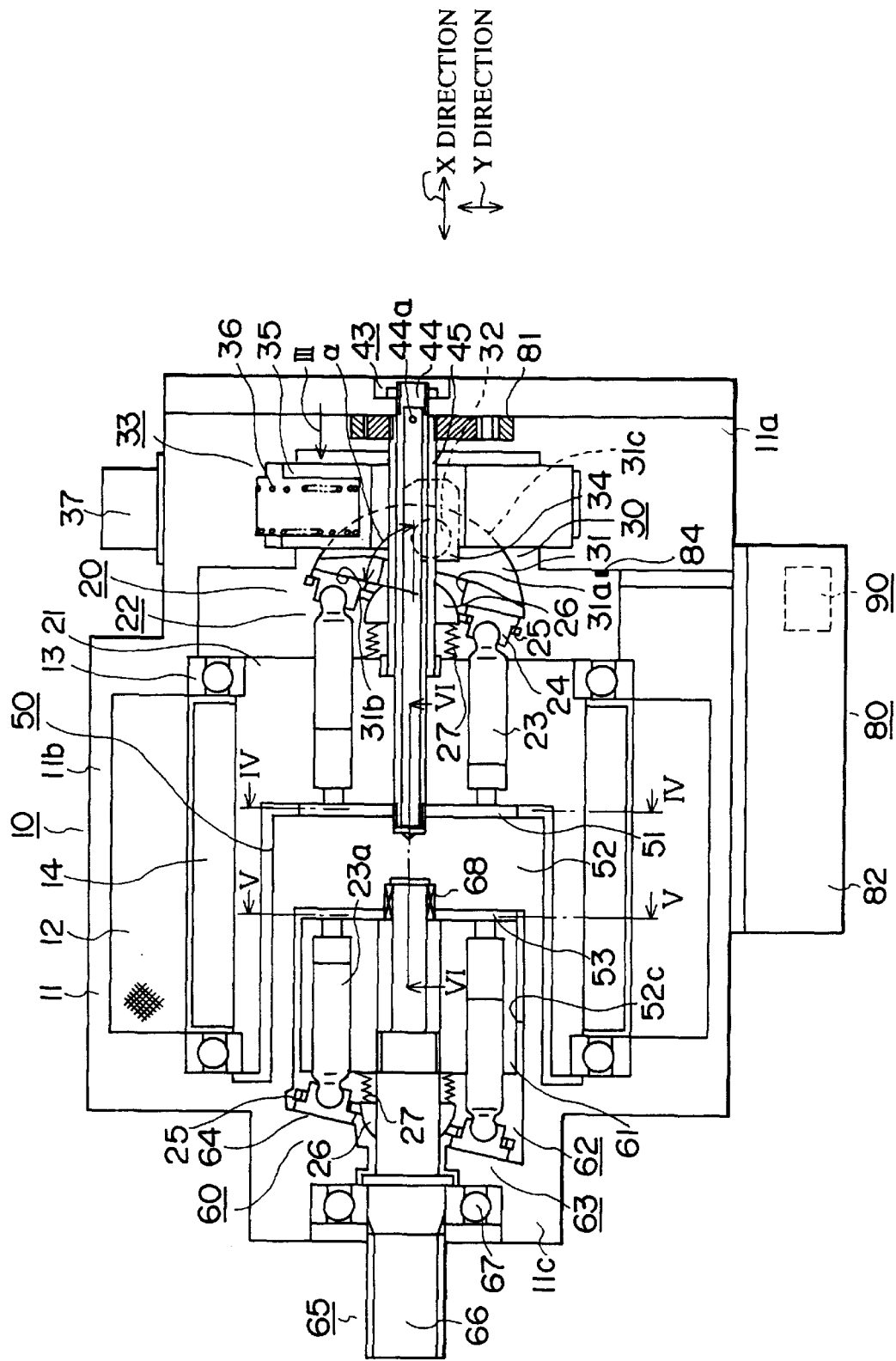
FIG. 2 is an explanatory view of a sectional side elevation of the electric hydraulic hybrid motor relating to the first embodiment.
Figure 3:
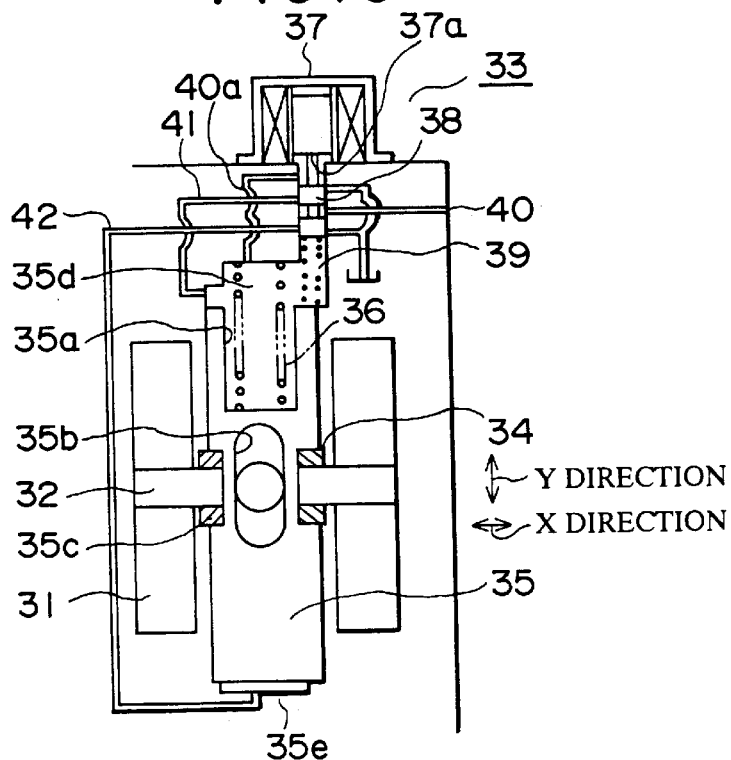
FIG. 3 is a view seen in a direction of the arrow III in FIG. 2.

In FIGS. 1 to 3, an electric hydraulic hybrid motor includes electric motor 10; a variable displacement hydraulic pump 20 (hereinafter, referred to as a hydraulic pump 20), which is housed inwardly of the stator 12 of the electric motor 10; a fixed displacement hydraulic motor 60 (hereinafter, referred to as a hydraulic motor 60), which is housed inwardly of the rotor 14 of the electric motor 10; a port block portion 50, for supplying and discharging oil between the hydraulic pump 20 and the hydraulic motor 60; a cooling device 80, which is attached to the case 11 of the electric motor 10 and which cools lubricating and cooling oil, and a controlling device 90.

The electric motor 10 is defined by a case 11; the stator 12, which is formed by winding a coil and is fixedly provided at the case 11; and the rotor 14, which is placed inwardly of the stator 12 and both ends of which are rotatably supported by the bearings 13, which are attached to the case 11. The case 11 is divided into a pump case 11a, an electrical drive case 11b, and a motor case 11c, in order to make the explanation easy.

The hydraulic pump 20 is defined by a cylinder block 21 for a pump (hereinafter referred to as a pump block 21), a plunger portion 22, a rocker cam portion 30, a swash plate control portion 33, and a shaft portion 43. The pump block 21 is formed integrally with the rotor 14 by press-fitting, welding, or the like, and both ends thereof are rotatably supported by the bearings 13, which are fixedly placed at the case 11.

The plunger portion 22 is defined by a plunger 23; a shoe 24, attached to the plunger 23 by calking or the like so as to freely rock; a retainer 25, for slidably pressing the shoe 24 into a rocker cam 31; and a spherical segment 26 and a spring 27 which collectively press the retainer 25 to make it press the shoe 24. The spring 27 presses the retainer 25 through the spherical segment 26 with one end abutted against the spherical segment 26 and with the other end abutted against the pump block 21. A number of plungers 23, for example, seven or nine plungers 23, can be used, and are equally distributed in the cylinder block 21 in a circumferential direction. Each plunger 23 is closely inserted into its chamber 21a in the cylinder block 21, and slides in a longitudinal direction of the axis (in the direction of X in FIG. 2) to discharge pressurized oil.

The rocker cam portion 30 is defined by a rocker cam 31 and a pin 32. The rocker cam 31 has a cylindrical hole 31a made at the center thereof, and one surface is formed by a flat surface 31b while the other surface is formed by a divided cylindrical surface 31c. The shoe 24 slides over the flat surface 31b, while the cylindrical surface 31c is rotationally rocked by being closely inserted into a receiving groove which has a cylindrical surface and is provided at the pump case 11a. The pin 32 is pressed into and fixed at the rocker cam 31.

A swash plate control portion 33 is defined by a slider 34, a piston 35, a piston spring 36, a solenoid 37, a spool 38, and a spool spring, 39. The piston 35 is formed by a cylinder, with a cylindrical opening 35a at one end, into which the piston spring 36 is inserted; and this cylinder has a long hole 35b in its central portion and slit grooves 35c on both sides of the central portion, into which the slider 34 is closely inserted. The pin 32 of the rocker cam 31 is attached to the slider 34 so as to be free to rock. When the piston 35 moves up and down (Y direction in FIG. 3), the slider 34, which is closely inserted into the slit grooves 35c, slides in a longitudinal direction of the axis (X direction); and the pin 32, attached to the slider 34 so as to be free to rock, moves in the Y direction and the X direction. As a result, the rocker cam 31 rocks along the cylindrical surface and changes a slanted rotation angle α.

The solenoid 37 is attached to the pump case 11a near is the piston 35, and the spool 38 is abutted against the foremost end portion 37a and is closely inserted into a spool hole in the pump case 11a. One end of the spool spring 39 is abutted against the spool 38 and presses the spool 38 so that the spool 38 is not away from the 20 foremost end portion 37a. The other end of the spool spring 39 is abutted against the piston 35. Formed in the pump case 11a, are a passageway 40, for supplying pressurized oil from a servo pump to the spool 38, and connecting passageways 41 and 42, for supplying pressurized control oil to pressure receiving chambers 35d and 35e, which are provided at opposite ends of the piston 35. A connecting passageway 40a, connecting to a tank in normal times, is provided at the pressure receiving chamber 35d.

A shaft portion 43 is defined by a shaft 44 and a driving shaft 45. The shaft 44 is placed at the axial core of the electric motor 10, the hydraulic pump 20, and the hydraulic motor 60, and is fixedly attached to the pump case 11a. On the outside of the shaft 44, a driving shaft, which drives a charging pump 81 consisting of a trochoidal pump, a gear pump, or the like, is connected to the pump block 21 through a spline 21e (refer to FIG. 6), and is provided with the same core as the shaft 44. The driving shaft 45 is inserted through the cylindrical hole 31a at the center of the rocker cam 31, guiding the spherical segment 26 which presses the retainer 25, and is inserted through the spring 27 which presses the sphere 26.

As shown in FIG. 2, the axial length of the pump cylinder block 21 is substantially coextensive with the axial length of the rotor 14, with the pump chambers 21a being formed in a first axial end of the pump cylinder block 21 and a large cylindrical cavity 21b being centrally formed in the second axial end of the pump cylinder block 21.

Figure 4:
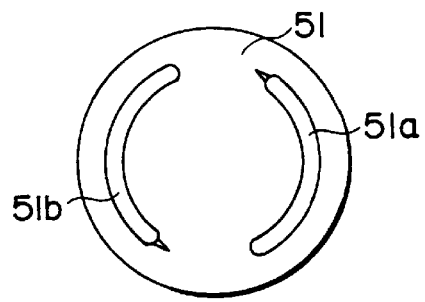
FIG. 4 is an explanatory view taken on the line IV—IV in FIG. 2.
Figure 5:
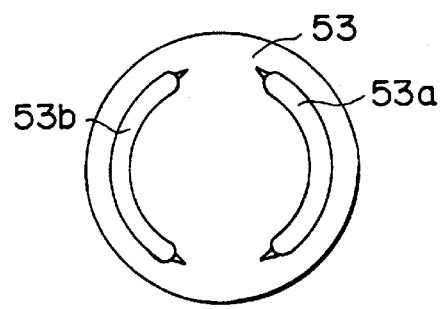
FIG. 5 is an explanatory view taken on the line V—V in FIG. 2.
Figure 6:
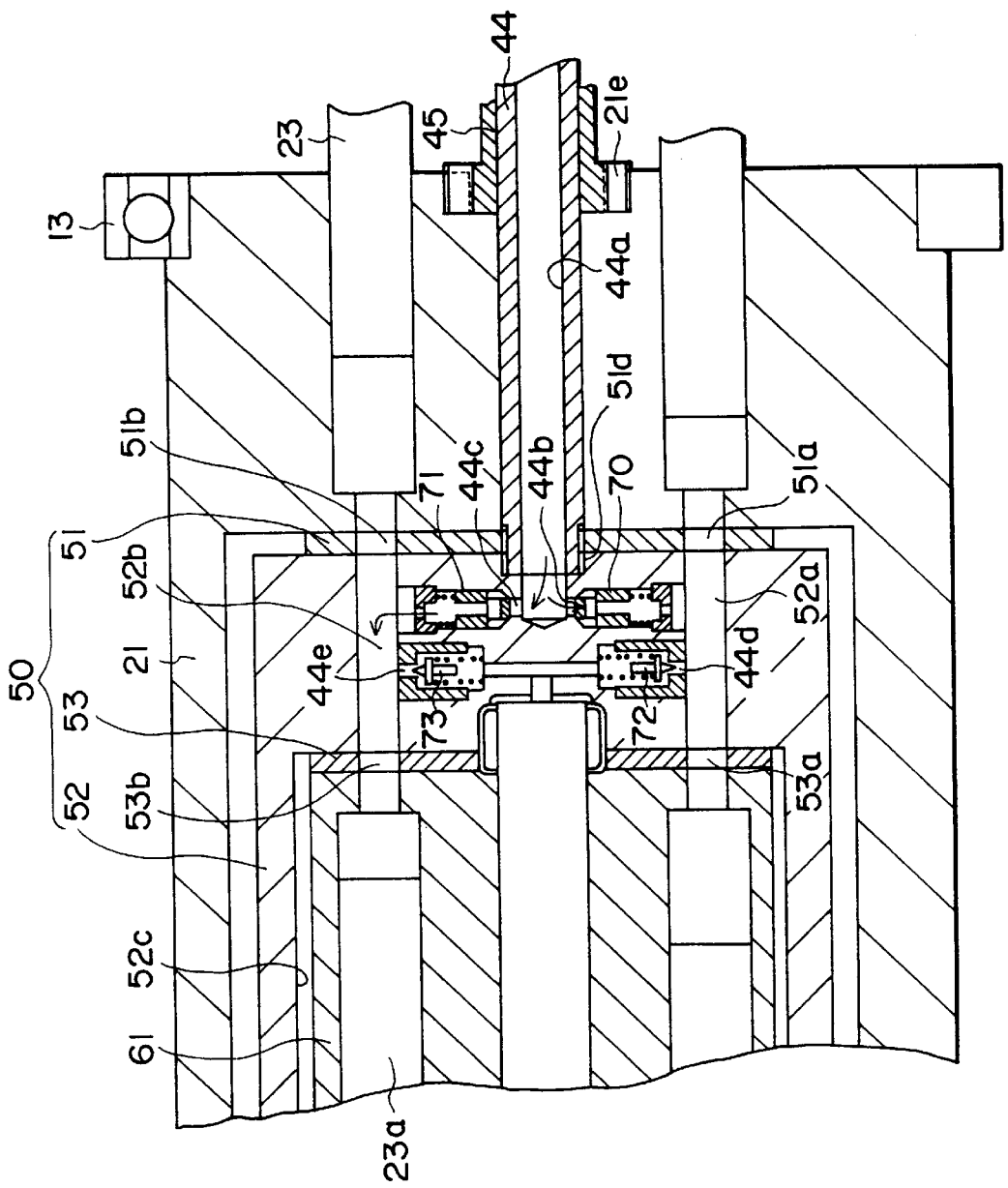
FIG. 6 is a sectional view taken on the line VI—VI in FIG. 2.

In FIGS. 4 to 6, the part block portion 50 is defined by a valve seat 51 for the hydraulic pump 20, the port block 52, and a valve seat 53 for the hydraulic motor 60. The port block 52 is positioned in the large cavity 21b in the second axial end of the pump cylinder block 21. The valve seat 51 for the pump is formed by a disc, and has two ports 51a and 51b in an arc form, and the flow of discharge or the flow of intake is discharged or supplied. The port block 52 is formed by a cylinder with the valve seat 51 for the pump being fixedly attached at one end and with the shaft 44 being fixedly attached at the central axial core with a treaded portion 51d. The port block 52 forms port passageways 52a and 52b, respectively communicating with the ports 51a and 51b. At the other end of the port block 52, a cylindrical hole 52c is formed. Inside the hole 52c, the valve seat 53 for the motor is fixedly attached, and the bearing of an output shaft 66, described below, is attached at the central axial core. The other end of the port block 52 is fixedly attached to the motor case 11c. The valve seat 53 for the motor is formed by a disc, and has two ports 53a and 53b, and the flow of discharge or the flow of intake from the hydraulic pump 20 is discharged or supplied. The valve seat 51 for the pump, the port block 52, and the valve seat 53 for the motor are separately constructed, but they can be constructed as one body.

In FIG. 2, the hydraulic motor 60 is defined by a cylinder block 61 for a motor (hereinafter, referred to as a motor block 61), a plunger portion 62, a rocker cam portion 63, and a output shaft portion 65. The motor block 61 is pressed to the valve seat 53 for the motor by a spring with the central axis being supported by the output shaft portion 65. The motor block 61 is rotatively positioned in a cavity 52a in the port block 52. The plunger portion 62 is constructed similarly to the plunger portion 22 of the hydraulic pump 20. The plunger 23a of the plunger portion 62 has the same structure as the plunger 23 of the hydraulic pump 20. Each plunger 23a is slidably positioned in its chamber 61a in the cylinder block 61.

In the rocker cam portion 63, the rocker cam 64 is formed by processing the motor case 11c. The output shaft portion 65 is defined by an output shaft 66; a bearing 67, fixedly attached to the motor case 11a; and a bearing 68, fixedly attached to the block 61 for the hydraulic motor. The output shaft 66 supports the block 61 for the hydraulic motor, and guides the spherical segment 26 which presses the retainer 25 of the hydraulic motor 60. A fixed capacity hydraulic motor is used for the hydraulic motor 60 of the present embodiment, but it goes without saying that a variable capacity hydraulic motor can be used.

FIG. 6 depicts a charging circuit to the hydraulic pump 20, which is placed inside the port block 52, and FIG. 1 depicts a block diagram of the charging circuit. As FIG. 2 depicts, there is a hole 44a, connected to a charging pump 81, in one end of the shaft 44.

The flow through the hole 44a branches into the two passages 44b and 44c, as illustrated in FIG. 6, with check valves 70 and 71 of the charging circuit being provided in the passages 44b and 44c, respectively. Safety valves 72 and 73 are respectively placed in communicating passageways 44d and 44e, which communicate with the ports holes 52a and 52b.

As FIGS. 1, 2, and 6 depict, a cooling device 80 is defined by a charging pump 81, commonly used by the charging circuit; an oil cooler 82; a cooling conduit line 83, extending from the case 11 to the oil cooler 82, or from the oil cooler 82 to the case 11; and a temperature sensor 84, for detecting the temperature of the lubricating oil.

Figure 7:
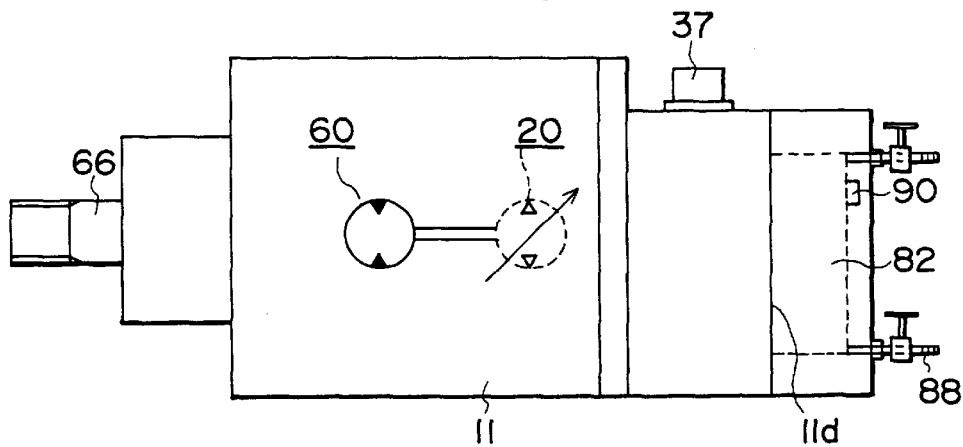
FIG. 7 is an explanatory view when a cooling device, relating to the first embodiment, is attached to the rear portion of a hydraulic pump.

The charging pump 81 is driven by a spline gear 21e, which is provided at the block 21 for the pump, and distributes oil to the charging circuit and the cooling circuit. The oil in the cooling circuit goes from the charging pump 81 to the oil cooler 82, and cools and lubricates the stator 12, the bearing 13 of the rotor 14, the shoe 24 of the plunger portion 22, and the bearings 67 and 68 of the output shaft portion 65. When the temperature sensor 84 detects that the temperature of the lubricating oil inside the case 11 has risen to a specified temperature or higher, a controlling device 90 controls the pressure of a variable relief valve 87 and flows the lubricating oil to the oil cooler 82. The cooling circuit can be operated from the starting time instead of being controlled with the controlling device 90. Further, in FIG. 1, the oil cooler 82 is attached on the side surface of the case 11, but as FIG. 7 depicts, the oil cooler 82 can be placed at the case 11d at the backside of the hydraulic pump 20. The oil cooler 82 can be provided with a valve 88 and can cool the oil by supplying cooling water or cooling gas from the outside.

A controlling device 90 includes a controller 91; an electric power consumption setting switch 92, for the electric motor 10; an output torque setting switch 93, for the hydraulic motor 60; a voltage detecting sensor 94, which detects the voltage to the stator 12; an electric current detecting sensor 95, which detects the electric current to the stator 12; a rotational speed detecting sensor 96, which detects the rotational speed of the hydraulic motor 60; and the temperature sensor 84, which detects the temperature of the oil in the cooling device 80.

The controller 91 measures the temperature of the oil for lubrication and cooling in the case 11, and when the temperature becomes a specified value or higher, the controller 91 outputs a command to the cooling device 80 to actuate the same. The controller 91 computes the actual electric power consumption of the electric motor 10, based on the voltage and the current to the stator 12. The controller 91 compares the electric power consumption set value, from the electric power consumption setting switch 92, and the actual electric power consumption of the electric motor 10, and outputs to the swash plate control portion 33 a signal for controlling the discharge rate from the hydraulic pump 20. Or the controller 91 computes the actual output torque outputted by the hydraulic motor 60, based on the voltage and the current to the stator 12 and the rotational speed of the hydraulic motor 60. The controller 91 compares the set output torque, from the output torque setting device 93, and the compiled output torque, and outputs to the swash plate control portion 33 a signal for controlling the amount of discharge from the hydraulic pump 20.

Now, the operation of the electric hydraulic hybrid motor will be explained.

The controlling device 90 passes a specified current to the stator 12 to make it generate magnetism and to rotate the rotor 14 in either direction selected from right and left directions. As a result of the above, the pump block 21, formed integrally with the rotor 14, is rotated in a specified direction. At this time, when the controlling device 90 directs the rotational speed of the output shaft 66 of the hydraulic motor 60 to be zero, the discharge rate from the hydraulic pump 20 is controlled to be zero. To this end, an angle a of the rocker cam 31 is made to be 90 degrees, and the flat surface 31b of the rocker cam 31 is controlled so as to be perpendicular to the axial core.

When explaining the operation specifically, the solenoid 37 initially receives the command from the controlling device 90, and presses the spool 38 with a specified amount of thrust. The controlling oil pressure through the spool 38 acts on the pressure receiving chamber 35e of the piston 35, and presses the piston 35 in an upward direction in FIG. 3. As a result, the rocker cam 31 has a smaller slanted rotational angle, specifically, the flat surface 31b of the rocker cam 31 is made to be perpendicular to the axial core. At this time, the piston 35 presses the spool spring 39 upwardly, and returns the spool 38 to the original position, thereby stopping the controlling pressure to the pressure receiving chamber 35e; and the movement of the piston 35 is stopped. Accordingly, the amount of the pressurized oil supplied from the hydraulic pump 20 to the hydraulic motor 60 becomes zero, and the output shaft 66 is not rotated.

The output shaft 66 can be rotated at a specified rotational speed by making the hydraulic pump 20 to discharge at a specified discharge rate. Similarly to the above-described control of the hydraulic pump 20, the hydraulic pump 20 is controlled to have a specified discharge rate Qp, by outputting the command from the controlling device 90 to the solenoid 37, and by controlling the angle α of the rocker cam 31 of the hydraulic pump 20 to be a specified angle. The rotational speed of the output shaft 66 of the hydraulic motor 60 is shown by the following equation.

$$Nm=(Qp/Qm) \times Np$$

Here,

NM=the rotational speed of the output shaft 66 of the hydraulic motor 60,

Np=the rotational speed of the hydraulic pump 20 (rotational speed of the rotor 14), Qm=the discharge rate of the hydraulic motor 60 (cc/rev), and Qp=the discharge rate from the hydraulic pump 20 (cc/rev).

If the discharge rate Qp of the hydraulic pump 20 is in the range from +Qm (cc/rev) to −Qm, the rotational speed Nm of the hydraulic motor 60 has a value from +Np to −Np.

When the intake rate is not enough for the discharge rate from the hydraulic pump 20, as the result of pressurized oil leaking from the hydraulic pump 20, the hydraulic motor 60, or from the port block 52, pressurized oil is supplied through the check valves 70 and 71 in the charging circuit in the port block 52. As a result, the pressurized oil is replenished from the vicinity, so that a vacuum is not produced with less resistance, and the pressure in the charging circuit can be set low.

Figure 8:
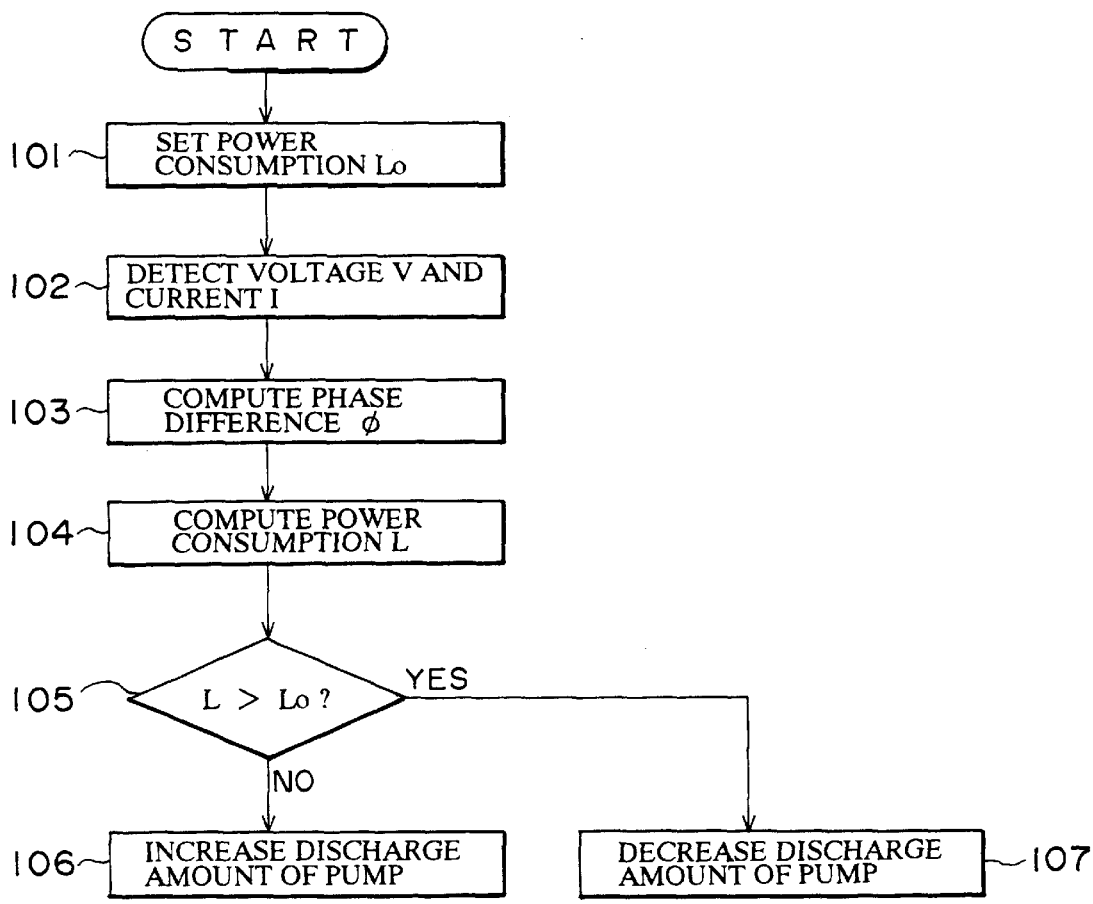
FIG. 8 is a flow chart of the equal horsepower control relating to the first embodiment.

Next, an equal horsepower control will be explained with reference to the flow chart in FIG. 8.

In step 101, the electric power consumption Lo for the electric hydraulic hybrid motor is inputted and memorized in a storage device (not illustrated) of the controller 91 by the electric power consumption setting switch 92 in accordance with the electric power of each facility in a factory or the like, or the electric power consumption of a device to be driven. In step 102, the voltage V and the current I to the stator 12 of the electric motor 10 are detected by the voltage detecting sensor 94 and the electric current detecting sensor 95, and each detected value is sent to the controller 91. In step 103, the controller 91 obtains phase difference φ from the transition in the change of the voltage or the current. In step 104, the controller 91 obtains the actual electric power consumption L, which is consumed when the electric motor 10 actually drives the hydraulic pump 20, from the formula $[L=V \times I \times \cos \phi]$.

In Step 105, it is determined whether the actual electric power consumption L is greater than the electric power consumption set value Lo. When the actual electric power consumption L is Lo or less ($L \leq Lo$), the control process proceeds to step 106. In step 106, the controller 91 outputs a control signal to the solenoid 37, to increase the discharge rate from the hydraulic pump 20. The solenoid 37 is displaced by receiving the signal, presses the spool 38, and sends the pressurized pilot oil from the charging pump 81 to the pressure receiving chamber 35d of the piston 35 to move the piston 35. The piston 35 changes the angle α of the rocker cam 31 through the slider 34, and increases the discharge rate Qp from the hydraulic pump 20.

On the other hand, when the actual electric power consumption L is greater than Lo (L>Lo), the control process proceeds to step 107, and the controller 91 outputs to the solenoid 37 a control signal to decrease the discharge rate from the hydraulic pump 20.

The solenoid 37 is displaced by receiving the signal, presses the spool 38, and sends the pressurized pilot oil from the charging pump 81 to the pressure receiving chamber 35e of the piston 35 to move the piston 35. By that movement, the angle α of the rocker cam 31 is changed, and the discharge rate Qp is decreased. As a result, the electric power consumption of the electric motor 10 is increased and a constant electric power consumption can be obtained.

As in the above, by controlling the electric motor 10 so as to consume a constant electric power, the equal horsepower control of an electric hydraulic hybrid motor can be carried out, thereby enabling the equal horsepower control up to the upper limit of the output of the electric motor 10. For example, at a time of a suspending operation in a crane or the like, when suspending a heavy load, the speed is controlled at a low setting, and when suspending a light load, the speed is controlled at a high setting.

Figure 9:
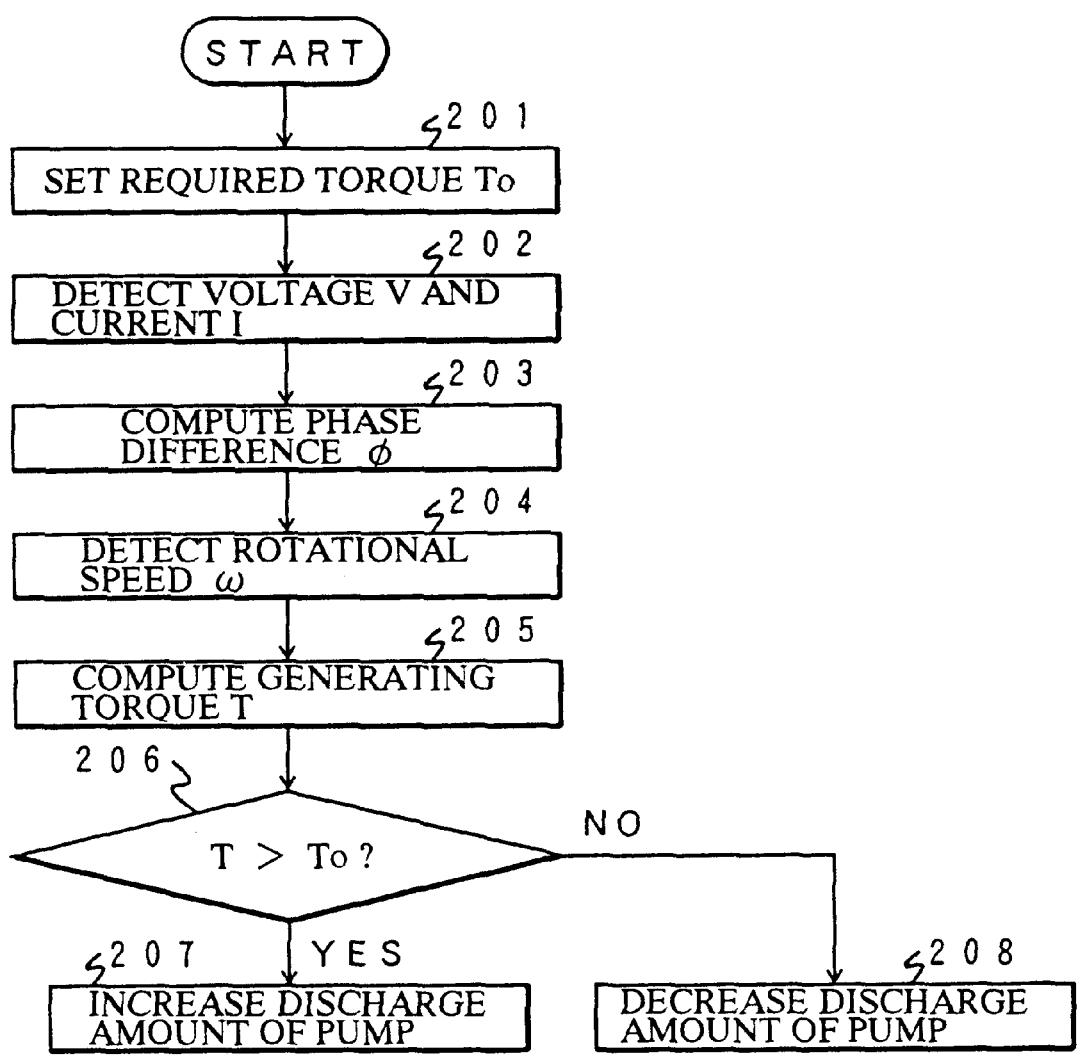
FIG. 9 is a flow chart of the equal torque control relating to the first embodiment.

Next, an equal torque control will be explained by using the flow chart in FIG. 9.

In step 201, the storage device of the controller 91 has a required torque To for the hydraulic motor 60 inputted by the output torque setting switch 93 in accordance with a required torque of the device to be driven and memorizes the same. In step 202, the voltage V and the current I to the stator 12 are detected by the voltage detecting sensor 94 and the current detecting sensor 95, and each detected value is sent to the controller 91. In step 203, the controller 91 obtains the phase difference φ from the transition in the changes of the voltage or the current. In step 204, the rotational speed ω of the output shaft 66 of the hydraulic motor 60 is detected, by the rotational speed detecting sensor 96, and is sent to the controller 91. In step 205, the controller 91 obtains the actual generating torque T of the electric motor 10 from the formula $[T=(V \times I \times \cos \phi)/\omega]$.

In step 206, it is determined whether the actual generating torque T is greater than the required torque To from the output torque setting switch 93. When the actual generating torque T is greater than the required torque To (T>To), the control process proceeds to step 207. In step 207, the controller 91 outputs to the solenoid 37 a control signal to increase the discharge rate from the hydraulic pump 20. The solenoid 37 is displaced after receiving the signal, pressing the spool 38 and sending the pressurized pilot oil from the charging pump 81 to the pressure receiving chamber 35d to move the piston 35. The piston 35 changes the angle α of the rocker cam 31 through the slider 34, and increases the discharge rate Qp of the hydraulic pump 20, thereby increasing the rotational speed of the hydraulic motor 60 and decreasing the actual generating torque T.

On the other hand, when in step 207 the actual generating torque T is the required torque To or less ($T \leq To$), the control process proceeds to step 208. In step 208, the controller 91 outputs a control signal to the solenoid 37 to decrease the discharge rate from the hydraulic pump 20. The solenoid 37 is displaced after receiving the signal, pressing the spool 38 and sending the pressurized pilot oil from the charging pump 81 to the pressure receiving chamber 35e, to move the piston 35. This movement displaces the angle α of the rocker cam 31 and decreases the discharge rate Qp, thereby decreasing the rotational speed of the hydraulic motor 60 and increasing the actual generating torque T.

By controlling as in the above, the equal torque control can be obtained. Accordingly, when the limit torque of the driving system of the machine to be used has already been set, the machine can be used with the output torque being constantly regulated. As in the above, an accurate output of the rotational speed can be controlled by carrying out a feedback control by detecting the rotational speed ω of the output shaft 66 at the rotational speed sensor 96.

Figure 10:
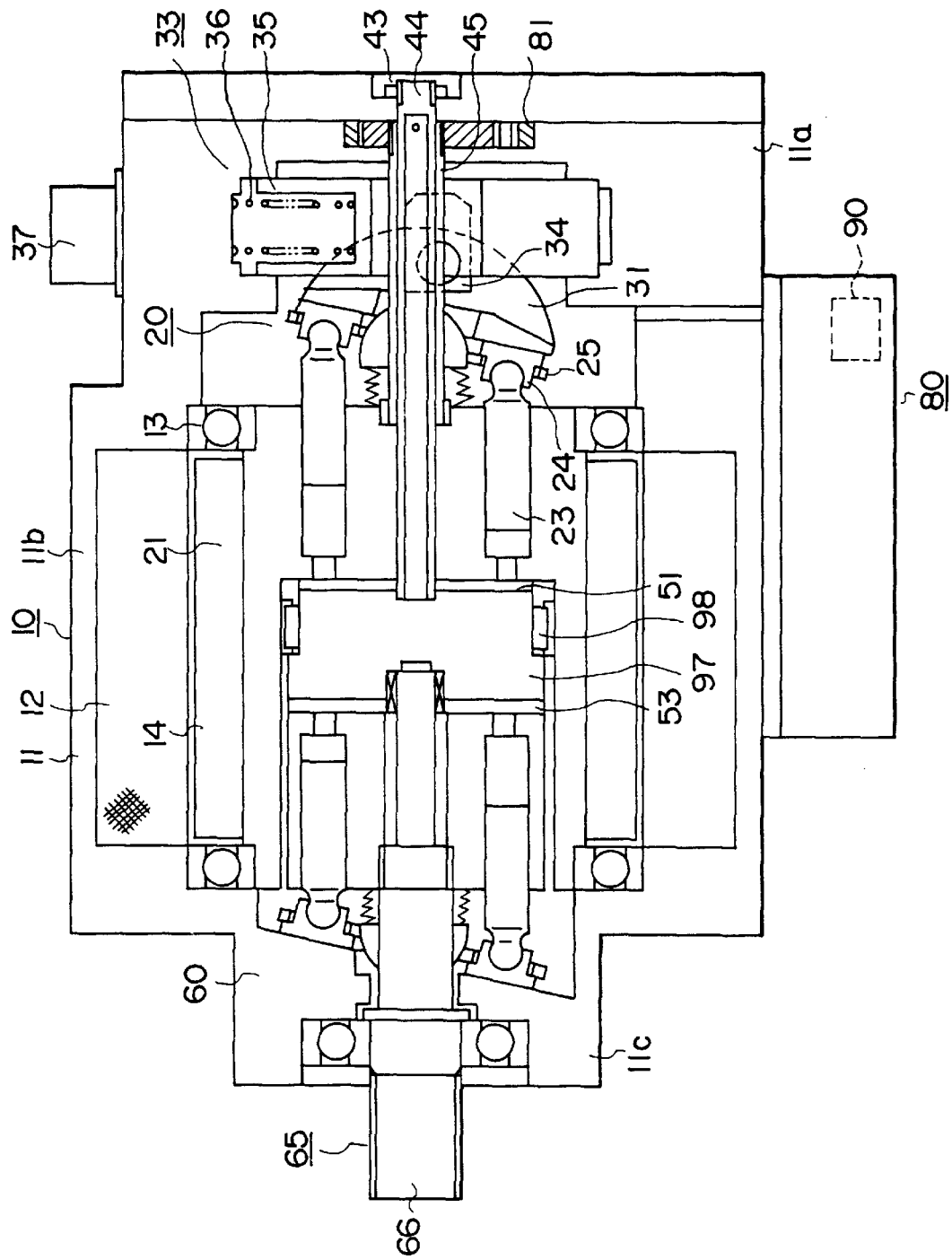
FIG. 10 is a general block diagram of an electric hydraulic hybrid motor relating to a second embodiment of the present invention.

Next, a second embodiment of the electric hydraulic hybrid motor relating to the present invention will be explained. In the first embodiment, the port block 52 of the port block portion 50 is attached to the motor case 11c with the other end thereof being fixed to the motor case 11c. On the other hand, in the second embodiment, as FIG. 10 depicts, a port block 97 is supported by a bearing 98, which is fixedly attached to the pump block 21. Accordingly, the pump block 21 is rotated, but the port block 97 is not rotated and is stopped. The operation is the same as in the first embodiment.

As explained in the above, according to the present invention, the entire length is shortened as a result of placing the hydraulic pump and the hydraulic motor in a position inwardly of the stator and the rotor of the electric motor. In addition, the hydraulic pump and the hydraulic motor are placed so as to be opposed to each other; therefore, the structure can be simplified. By giving the power from the electric motor to the hydraulic pump, and by driving the hydraulic motor by the hydraulic pump, a specified rated torque can be obtained from low speed to high speed. Further, by using the hydraulic pump and the hydraulic motor, the output rotational speed can be easily changed from low speed to high speed, and the rotational direction can be easily changed. As for the electric motor, the hydraulic pump and the hydraulic motor, generated heat is removed and lubrication is provided by the oil cooler which is attached to the case; therefore, the structure is simplified. In addition, as the temperature of the lubricating oil is detected by the temperature sensor, and is automatically controlled to be a specified temperature, the management, maintenance and operation can be simplified. The equal horsepower control is carried out by measuring the electric power consumption of the electric motor and controlling the set value of the measured value; therefore, in the case of a crane, the speed can be changed in accordance with conditions in which the crane is used, and the operation efficiency can be improved. The equal torque control is carried out by measuring the output rotational speed and by controlling the discharge rate of the hydraulic pump; therefore, when the output torque is limited, an excellent effect of enabling torque limiter control can be obtained.

INDUSTRIAL APPLICABILITY

The present invention is useful as an electric hydraulic hybrid motor, which is smaller in size with the hydraulic pump being housed inside the stator of the electric motor and with the hydraulic motor being housed inside the rotor of the electric motor, and which has excellent performance.

We claim:

1. An electric hydraulic hybrid motor which includes an electric motor, a hydraulic pump which is driven by said electric motor, and a hydraulic motor which is driven by said hydraulic pump, with said hydraulic pump or said hydraulic motor being placed inwardly of a rotor of said electric motor;

wherein said hydraulic pump (20) is placed inwardly of the stator (12) of said electric motor (10) and said hydraulic motor (60) is placed inwardly of said rotor (14);

wherein said hydraulic pump (20) includes a cylinder block (21) for a pump and a plunger (23) for the pump which are rotated integrally with said rotor (14);

wherein said hydraulic motor (60) includes a cylinder block (61) for a motor and a plunger (23a) for the motor; and further comprising:

a port block (52) which supplies and discharges oil between said cylinder block (21) for the pump and said cylinder block (61) for the motor, and a case (11) which is provided with said electric motor (10), said hydraulic pump (20), and said hydraulic motor (60) therein, and which supports said port block (52).

2. An electric hydraulic hybrid motor comprising:

an electric motor having a stator and a rotor;

a hydraulic pump, which is driven by said electric motor and which is positioned inwardly of said stator of said electric motor;

said hydraulic pump including a pump cylinder block, having at least one first chamber formed therein, and at least one pump plunger, each pump plunger being slidably positioned in a respective one of said at least one first chamber in said pump cylinder block so that each pump plunger is rotatable integrally with said pump cylinder block, said pump cylinder block being rotatable integrally with said rotor; and a hydraulic motor, which is driven by said hydraulic pump and which is positioned inwardly of said rotor of said electric motor;

said hydraulic motor including a motor cylinder block, having at least one second chamber formed therein, and at least one motor plunger, each motor plunger being slidably positioned in a respective one of said at least one second chamber.

3. An electric hydraulic hybrid motor in accordance with claim 2, wherein said pump cylinder block is positioned inwardly of said rotor.

4. An electric hydraulic hybrid motor in accordance with claim 3, wherein said motor cylinder block is positioned inwardly of a portion of said pump cylinder block.

5. An electric hydraulic hybrid motor in accordance with claim 4, further comprising:

a variable swash plate control device for setting a discharge rate for said hydraulic pump; and a swash plate setting device for setting a discharge rate for said hydraulic motor.

6. An electric hydraulic hybrid motor in accordance with claim 5, further comprising a pump rocker cam for causing axial movement of said at least one pump plunger, and wherein said variable swash plate control device controls said pump rocker cam to set a discharge rate for said hydraulic pump.

7. An electric hydraulic hybrid motor in accordance with claim 5, wherein said swash plate setting device for setting a discharge rate for said hydraulic motor comprises an output shaft, and a motor rocker cam for causing rotation of said output shaft responsive to axial movement of said at least one motor plunger.

8. An electric hydraulic hybrid motor in accordance with claim 5, further comprising a case, and wherein said pump cylinder block, said at least one pump plunger, said motor cylinder block, said at least one motor plunger, said variable swash plate control device, and said swash plate setting device are positioned within said case.

9. An electric hydraulic hybrid motor in accordance with claim 2, further comprising a case containing said electric motor, said hydraulic pump, and said hydraulic motor therein; and a cooling device.

10. An electric hydraulic hybrid motor in accordance with claim 2, further comprising:

a port block which supplies and discharges oil between said pump cylinder block and said motor cylinder block, said port block being positioned between said pump cylinder block and said motor cylinder block.

11. An electric hydraulic hybrid motor in accordance with claim 10, further comprising a source of pressurized oil; and
a charging hydraulic circuit for passing pressurized oil from said source to said port block.

12. An electric hydraulic hybrid motor in accordance with claim 10, further comprising a case which contains said electric motor, said hydraulic pump, and said hydraulic motor therein, and wherein said case supports said port block.

13. An electric hydraulic hybrid motor in accordance with claim 12, wherein said port block is secured to said case.

14. An electric hydraulic hybrid motor in accordance with claim 12, further comprising a cooling device for cooling oil which is passed through said first and second chambers.

15. An electric hydraulic hybrid motor in accordance with claim 10, wherein said port block is supported by said rotor.

16. An electric hydraulic hybrid motor in accordance with claim 10, wherein said port block is supported by a bearing which is positioned between said port block and said pump cylinder block.

17. An electric hydraulic hybrid motor in accordance with claim 2, wherein said pump cylinder block has a first axial end and a second axial end, wherein each said at least one first chamber is formed in said first axial end of said pump cylinder block, wherein a cavity is formed in said second axial end of said pump cylinder block, and wherein said motor cylinder block is positioned in said cavity in said pump cylinder block.

18. An electric hydraulic hybrid motor in accordance with claim 17, further comprising:
a port block which supplies and discharges oil between said pump cylinder block and said motor cylinder block, said port block being positioned between said pump cylinder block and said motor cylinder block.

19. An electric hydraulic hybrid motor in accordance with claim 18, wherein said port block contains passageways communicating between said first chambers and said second chambers.

20. An electric hydraulic hybrid motor in accordance with claim 19, wherein each of the passageways communicating between said first chambers and said second chambers contains a check valve.

21. An electric hydraulic hybrid motor in accordance with claim 18, further comprising a case which contains said electric motor, said hydraulic pump, and said hydraulic motor therein;
wherein said port block is positioned in the cavity in said pump cylinder block;
wherein said port block is secured to said case and has a cavity formed in said port block; and
wherein said motor cylinder block is positioned in the cavity in said port block.

22. An electric hydraulic hybrid motor in accordance with claim 18, wherein said motor cylinder block is positioned in the cavity in said pump cylinder block; and
wherein said port block is positioned in the cavity in said pump cylinder block axially between said pump cylinder block and said motor cylinder block.

23. An electric hydraulic hybrid motor in accordance with claim 2, wherein said at least one first chamber comprises a plurality of first chambers circumferentially distributed evenly in a first axial end of said pump cylinder block, wherein said at least one pump plunger comprises a plurality of pump plungers with each of said pump plungers being slidably positioned in a respective one of said plurality of first chambers, wherein said at least one second chamber comprises a plurality of second chambers circumferentially distributed evenly in an axial end of said motor cylinder block, and wherein said at least one motor plunger comprises a plurality of motor plungers with each of said motor plungers being slidably positioned in a respective one of said plurality of second chambers.

\* \* \* \* \*